United States Patent [19]

Becker et al.

[11] Patent Number: 4,610,505

[45] Date of Patent: Sep. 9, 1986

[54] SHEATH FOR LIGHT WAVEGUIDES

[75] Inventors: Johann A. Becker, Overath; Helmut Wirth, Odenthal; Werner Zell, Cologne, all of Fed. Rep. of Germany

[73] Assignee: U.S. Philips Corporation, New York, N.Y.

[21] Appl. No.: 731,336

[22] Filed: May 6, 1985

Related U.S. Application Data

[63] Continuation of Ser. No. 544,755, Oct. 24, 1983.

[30] Foreign Application Priority Data

Oct. 27, 1982 [DE] Fed. Rep. of Germany ....... 3239667

[51] Int. Cl.⁴ ................................................. G02B 6/44
[52] U.S. Cl. ............................. 350/96.23; 350/96.10; 174/109; 174/110 R; 174/110 SR
[58] Field of Search .............. 350/96.10, 96.20, 96.21, 350/96.22, 96.23; 174/68 R, 70 R, 70 S, 73 R, 102 R, 108, 109, 115, 110 R, 110 SR

[56] References Cited

U.S. PATENT DOCUMENTS

| 4,093,342 | 6/1978 | Foord et al. | 350/96.23 |
|---|---|---|---|
| 4,166,670 | 9/1979 | Ramsay | 350/96.23 |
| 4,232,935 | 11/1980 | Rohner et al. | 350/96.23 |
| 4,342,500 | 8/1982 | Oesteich et al. | 350/96.23 |
| 4,374,608 | 2/1983 | Anderson | 350/96.23 |
| 4,392,714 | 7/1983 | Bruggendieck et al. | 350/96.23 |

FOREIGN PATENT DOCUMENTS

| 2723659 | 11/1978 | Fed. Rep. of Germany ... 350/96.23 |
| 2902546 | 7/1980 | Fed. Rep. of Germany ... 350/96.23 |
| 2902576 | 7/1980 | Fed. Rep. of Germany ... 350/96.23 |
| 2497964 | 7/1982 | France ............................. 350/96.23 |
| 55-12935 | 1/1980 | Japan ............................... 350/96.23 |
| 1486764 | 9/1977 | United Kingdom ............. 350/96.23 |
| 1601003 | 10/1981 | United Kingdom ............. 350/96.23 |

OTHER PUBLICATIONS

Baumeister et al., "Standard Handbook for Mechanical Engineers", 7th ed., pp. 5-36.

Primary Examiner—William L. Sikes
Assistant Examiner—Brian M. Healy
Attorney, Agent, or Firm—Marc D. Schechter

[57] ABSTRACT

A sheath for light waveguides. The sheath consists of a tube loosely surrounding one or more light waveguides. In a neutral bending plane, longitudinal elements are provided for absorbing tensile and compressive forces. The coefficient of expansion of the longitudinal elements corresponds to that of the light waveguides. The longitudinal elements are form-coupled and force-coupled to the tube.

19 Claims, 3 Drawing Figures

SHEATH FOR LIGHT WAVEGUIDES

This is a continuation of application Ser. No. 544,755, filed Oct. 24, 1983.

BACKGROUND OF THE INVENTION

The present invention relates to a sheath for light waveguides. The sheath comprises a member loosely surrounding one or more light waveguides. The sheath member absorbs axial tensile and compressive forces.

A series of problems arise in the manufacture of light waveguide cables when the synthetic resins and processing methods used in the manufacture of conventional cables are carried over into the manufacture of optical cables.

A fundamental difficulty in that the synthetic resins used for the coating, especially of the loose secondary coating, for the glass fibers and the sheath exhibit thermal behavior considerably different from that of light waveguide fibers. The thermal expansion differs by two orders of magnitude.

Moreover, synthetic resins, when subjected to tensile load, exhibit considerably larger expansion, which may be reversible or irreversible depending on the value of the tensile force.

Furthermore, extruded thermoplastics used in the manufacture of conventional telecommunication cables are subject to shrinkage due to aging. This shrinkage is accelerated when heated above the manufacturing temperature, insofar as it is not at least partly suppressed in a reeled cable.

When reeled, the cable and each of its components are subject to a bending strain. In the case of a synthetic resin tube, this also leads to a (preponderantly reversible) variation in length. When bent, the tube is longer than when straigtened.

These relationships have led to the definition of the term "overlength". According to cable construction materials and manufacturing processes, light waveguide fibers must be provided in the cable, especially in the secondary coating, with a certain overlength in order to obtain a symmetric "temperature-effective range" related to the manufacturing temperature. However, considerable problems arise in practice. In order to reduce these problems, experiments were performed to incorporate in the cable core and the cable sheath elements which absorb tensile and compressive forces. However, when incorporated in the core only, the behavior of the sheath is not influenced by it at all.

The incorporation of elements absorbing tensile and compressive forces in the sheath (for example laminating the sheath, closed armoring of twisted glass fiber connection elements, or mixed armoring of synthetic resin worms and glass fiber connection elements), however, also failed to provide satisfactory bending behavior. Whereas a bent pure synthetic resin tube is longer than a straight tube when the neutral bending line is shifted toward the center of curvature, shortening generally occurs when the known sheath constructions are bent and the neutral bending line is shifted away from the center of curvature. In the subsequent straightening, the shortening is reversible only partly or not at all.

In particular, bending of the sheath disrupts the connections between the materials so that the shrinkage behavior and the thermal expansion and contraction generally depend on whether the element was or was not previously bent.

SUMMARY OF THE INVENTION

It is an object of the invention to provide a sheath for light waveguide fibers which satisfies the following requirements:

(a) it can support a higher tensile load than pure synthetic resin, (b) it has reduced ageing shrinkage of the synthetic resin, (c) it has thermal expansion and contraction characteristics which correspond exactly or nearly to that of glass, and (d) it has little or no reversible or irreversible variation in length upon bending, and so it has negligible shift of the neutral bending line from the geometrical center.

According to the invention this object is achieved in that the sheath comprises a synthetic resin tube. In the neutral bending plane of the tube, longitudinal elements absorbing tensile and compressive forces are provided parallel thereto. The coefficient of expansion of each longitudinal element corresponds to that of the light waveguides. The longitudinal elements are form-coupled and force-coupled to the synthetic resin tube, at least partly.

This sheath according to the invention can easily be bent in one direction and substantially cannot be bent in a direction at right angles thereto. Consequently, in the construction of the sheath, the preferred bending plane is determined by the construction of the resin tube. The longitudinal elements extend in the neutral plane when bent, so that the connection of the sheath according to the invention is not ruptured. As a result of the form-coupling and force-coupling between the longitudinal element and the synthetic resin tube, thermal variations in length and also shrinkage of the synthetic resin tube are suppressed. The longitudinal elements themselves determine the tensive and compressive strengths in the longitudinal direction.

DESCRIPTION OF THE PREFERRED EMBODIMENTS

Figure 1:
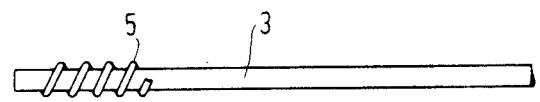
FIG. 1 is an elevational view of a longitudinal element used according to the invention.
Figure 2:
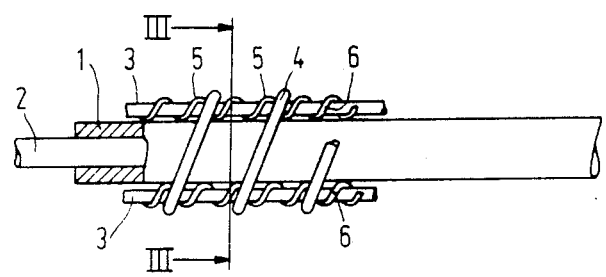
FIG. 2 is an elevational view, partly broken away, of a sheath according to the invention.

As shown in FIGS. 1 and 2, a sheath according to the invention comprises a tube 1 which is made of a synthetic resin. The tube 1 loosely surrounds light waveguide fiber 2 extending in the interior thereof. Thermoplastic synthetic resin or polyurethane is preferably the synthetic resin used to form the tube 1.

Figure 3:
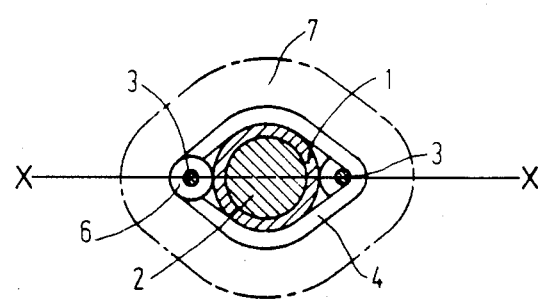
FIG. 3 is a sectional view taken on the line III—III of FIG. 2.

As shown in particular in FIG. 3, the tube 1 has a circular cross-section. Within the scope of the invention, however, other cross-sectional shapes are possible, for example a square or rectangular cross-section. In the interior of the tube, a single light waveguide fiber 2 or several parallel or twisted light waveguide fibers 2 may be provided. Hence the tube 1 may either replace the usual secondary coating of the light waveguide fibers or may serve as an outer sheath.

In the neutral bending plane X of the sheath, two longitudinal elements 3 are provided. Elements 3 are arranged parallel to the longitudinal axis but on opposite sides thereof on the outside of the tube 1. The elements 3 absorb tensive and compressive longitudinal forces.

A holding coil 4 (a radial pressure element) of high-strength material is wound transverse to the longitudinal axis and is connected or fixed to the longitudinal elements 3. The coil 4 winds around the axis once every few centimeters depending on the dimensions of the sheath. The stroke length should be such that the angle between coil 4 and the sheath axis is more than approximately 45°.

The resulting arrangement, whose outer contour is not completely circular, can easily be bent in one direction. It cannot be substantially bent in a direction at right angles thereto.

A force-coupled and form-coupled connection is provided between the longitudinal elements 3 and the tube 1 by the holding coil 4. Coil 4 exerts a radial pressure on the longitudinal elements. Furthermore, a similar force-coupled and form-coupled connection is formed between the holding coil 4 and the longitudinal elements 3.

Due to the fact that the longitudinal elements have a coefficient of thermal expansion corresponding to the lightwave fiber 3 provided in the sheath, they suppress thermal variations in length and prevent shrinkage of the sheath relative to the lightwave fiber.

In order to obtain a form-coupled and force-coupled connection between the longitudinal elements 3 and the tube 1, and the longitudinal elements 3 and the holding coil 4, the longitudinal elements 3 preferably have projections 5. With these projections 5, the longitudinal elements 3 press into the tube 1 under the radial pressure of the holding coil 4. In the same manner, the holding coil 4 is force-coupled with its turns between the individual projections 5.

A favorable shape for the projections 5 is shown in FIG. 1. The longitudinal elements 3 comprise a composite material of twisted or parallel epoxide resin-soaked glass fibers. The thickness of the longitudinal elements 3 is chosen depending on the diameter of the tube 1 and the tensile forces required for the cable.

The longitudinal elements 3 can be made by tightly winding a multifiber glass fiber litz wire 6 over a central element. The wire 6 may be impregnated with epoxide resin. Wire 6 should be wound to form closely spaced projections. The wound structure is also impregnated preferably in epoxide resin, cured and thus fixed on the longitudinal elements 3.

In the embodiment shown, the holding coil 4 is a litz wire of high-strength strands of glass fibers. However, the holding coil 4 could alternatively be a high-strength tape. Moreover, metallic tape or a wire may also be used.

The shape of the projections 5 shown in FIG. 1 could also be produced differently. This may be the case, in particular, when the longitudinal elements are, for example, steel (such as Invar steel) or carbon fibers.

Furthermore, it is possible according to the invention to form the holding coil 4, for example, of an extruded synthetic resin. It is again important that form-coupling and force-coupling are achieved between the extruded synthetic resin tube 1 and the longitudinal elements 3.

In the embodiment shown in FIG. 3, the holding coil 4 is surrounded by an outer sheath 7. Sheath 7 can fill all the remaining cavities and can be force-coupled to the tube 1 as much as possible. In the embodiment shown, the outer sheath 7 is shown in broken lines. While the force-coupled connection of the outer sheath 7 is not necessary, it is advantageously force-coupled and form-coupled to the longitudinal elements 3 and/or the holding coil 4. Such an outer sheath comprises, for example, a thermoplastic synthetic resin.

The tube 1 and the outer sheath 7, however, may also be a so-called laminated sheath or may consist of a metallic corrugated sheath having spiral-like or annular corrugations. In either case, they are form-coupled and force-coupled to the longitudinal elements 3.

In experiments with the sheath according to the invention, it could be established that little or no shifting of the materials occurs on the previously plane-ground faces, neither at room temperature nor in cold or warm conditions. As a result of this, substantially no relative movement occurred between the different materials, so that the behavior of the overall arrangement was determined by the longitudinal element 3.

Furthermore it may be advantageous according to the invention, if a circular sheath is desired, to provide the tube 1 with grooves which wholly or partly accept the longitudinal elements. For the same reason it may also be advantageous in certain circumstances, when the tube is not to be circular but is to be flattened on two opposite sides. In this case, also, no deviation from the circular cross-section is produced by the longitudinal elements.

The sheath according to the invention is particularly suitable, while using a suitable filler, to incorporate a larger number of twisted or parallel lightwave fibers provided with a primary coating only. For example, in the case of one hundred to two hundred fibers, a cable would be obtained of very small outside dimensions. A separate secondary coating for the lightguide fibers could be omitted because the sheath according to the invention already has a temperature expansion which substantially corresponds to that of the lightguide fibers.

It is already known from the prior art to provide light waveguide glass fibers in a sheath, where the sheath characteristics match those of the glass fibers. Reinforcement elements are also provided. (See, for example, German Offenlegungsschrift No. 2,902,576, U.S. Pat. No. 4,166,670, and United Kingdom Pat. No. 1,601,003.) However, this prior art does not show the sheath construction of the type according to the invention.

What is claimed is:

1. A sheath for glass fiber light waveguides, said sheath comprising:
    a synthetic resin tube surrounding one of more light waveguides, said tube having an outer surface and a neutral bending plane;
    a longitudinal element arranged against and parallel to the outer surface of the tube in the neutral bending plane for absorbing tensive and compressive forces applied to the sheath, said longitudinal element having a coefficient of expansion corresponding to that of the waveguides;
    a plurality of projections attached to the longitudinal element; and
    means for pressing the projections into the tube to deform the tube to mate with the projections.

2. A sheath as claimed in claim 1, further comprising a second longitudinal element arranged against and parallel to the outer surface of the tube in the neutral bending plane for absorbing tensive and compressive forces applied to the sheath, said second longitudinal element having a coefficient of expansion corresponding to that of the waveguides, said second longitudinal element being arranged on a side of the tube opposite the first longitudinal element.

3. A sheath as claimed in claim 2, characterized in that the pressing means further comprises a pressure element for radially pressing the longitudinal element toward the tube.

4. A sheath as claimed in claim 3, characterized in that the pressure element comprises a high-strength winding surrounding the longitudinal elements and the tube.

5. A sheath as claimed in claim 4, characterized in that the winding is a litz wire.

6. A sheath as claimed in claim 4, characterized in that the winding is an extruded synthetic resin.

7. A sheath as claimed in claim 3, further comprising:
an outer sheath surrounding the pressure element; and
means for pressing the outer sheath against the longitudinal element to cause the projections to engage the outer sheath.

8. A sheath as claimed in claim 7, characterized in that the outer sheath comprises a synthetic resin.

9. A sheath as claimed in claim 8, characterized in that the outer sheath is a metal with spiral or angular corrugations.

10. A sheath as claimed in claim 7, characterized in that the outer sheath is laminated.

11. A sheath as claimed in claim 3, characterized in that the resin tube has longitudinal grooves formed therein for accommodating the longitudinal elements.

12. A sheath as claimed in claim 3, characterized in that the longitudinal elements are glass fibers soaked in epoxide resin.

13. A sheath as claimed in claim 3, characterized in that the longitudinal elements are Invar steel.

14. A sheath as claimed in claim 3, characterized in that the tube is a thermoplastic synthetic resin.

15. A sheath as claimed in claim 3, characterized in that the tube is a polyurethane.

16. A sheath as claimed in claim 3, characterized in that the tube is laminated.

17. A sheath as claimed in claim 3, chracterized in that the tube is a corrugated metal.

18. A sheath as claimed in claim 3, characterized in that the longitudinal elements are arranged between the outer surface of the tube and the pressure element.

19. A sheath as claimed in claim 1, characterized in that the projections comprise a resin-soaked glass fiber wrapped around the longitudinal element.

* * * * *

UNITED STATES PATENT AND TRADEMARK OFFICE
CERTIFICATE OF CORRECTION

PATENT NO. : 4,610,505

DATED : September 9, 1986

INVENTOR(S) : JOHANN A BECKER ET AL

It is certified that error appears in the above-identified patent and that said Letters Patent is hereby corrected as shown below:

IN THE CLAIMS:

Claim 1, line 3, "of" should read --or--.

Signed and Sealed this

Twenty-third Day of December, 1986

Attest:

DONALD J. QUIGG

*Attesting Officer*      *Commissioner of Patents and Trademarks*